Dec. 1, 1931.　　　　C. H. LOGUE　　　　1,834,790
VARIABLE SPEED POWER TRANSMISSION
Filed Aug. 12, 1929　　2 Sheets-Sheet 1
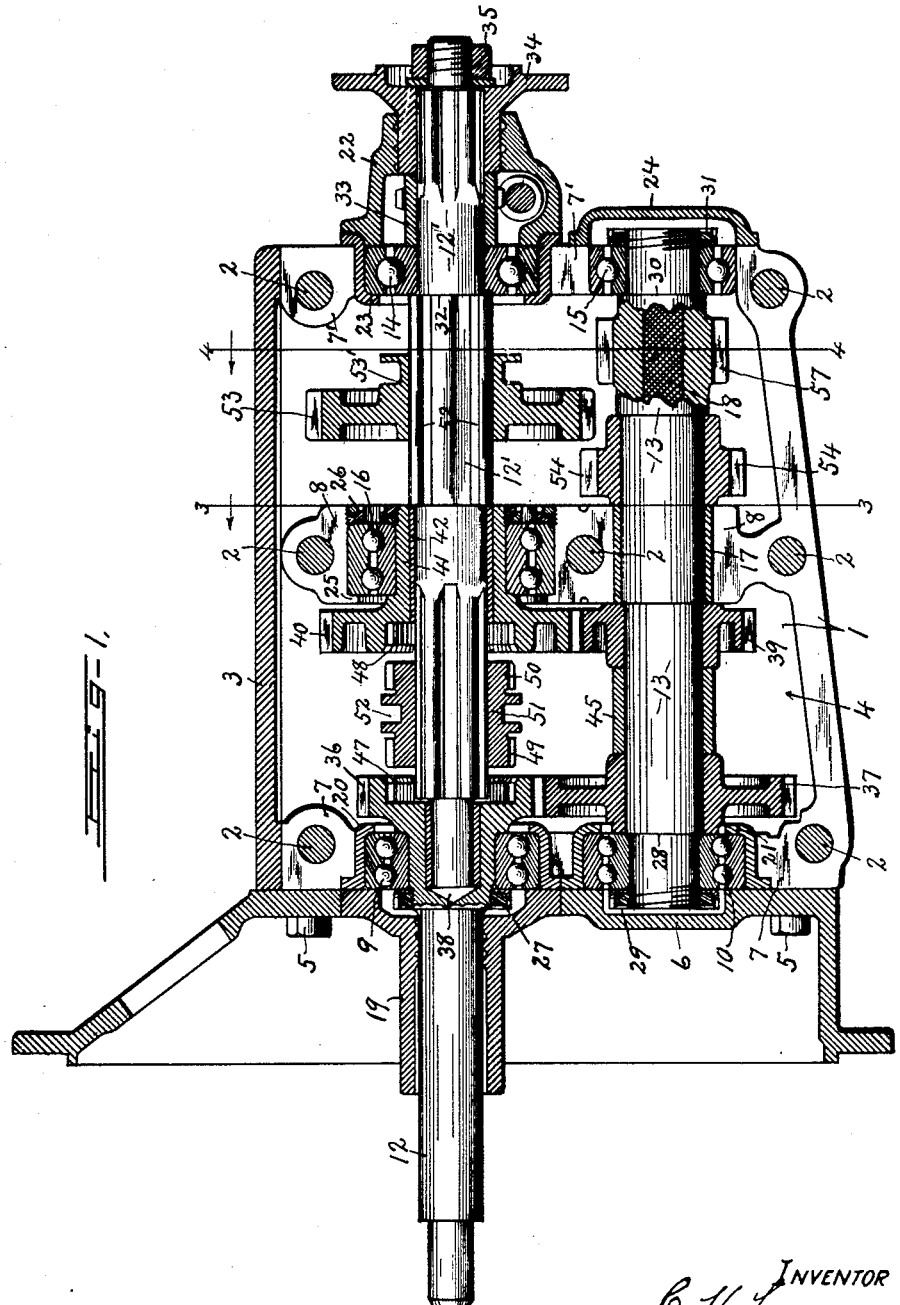
WITNESS
H. L. Meade.
INVENTOR
C. H. Logue
BY
Denison + Thompson
ATTORNEYS Dec. 1, 1931.    C. H. LOGUE    1,834,790
VARIABLE SPEED POWER TRANSMISSION
Filed Aug. 12, 1929    2 Sheets-Sheet 2
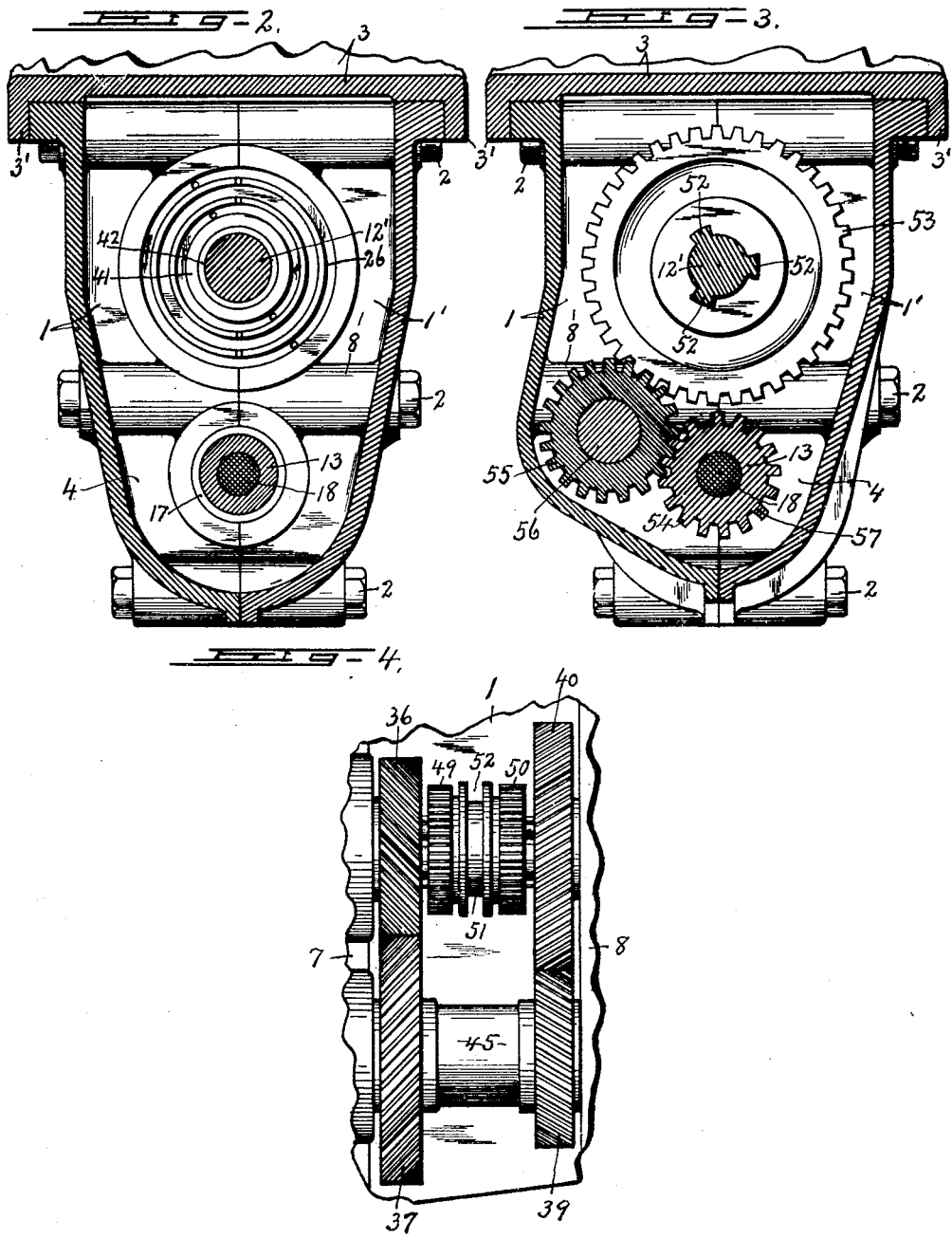

Patented Dec. 1, 1931

1,834,790

UNITED STATES PATENT OFFICE

CHARLES H. LOGUE, OF SYRACUSE, NEW YORK

VARIABLE SPEED POWER TRANSMISSION

Application filed August 12, 1929. Serial No. 385,106.

This invention relates to a variable speed power transmitting mechanism preferably of the selective sliding gear type adapted to be used more particularly in the connection between the crankshaft of the engine and running gear of a motor vehicle and involves the use of relatively rotatable co-axial driving and driven-shafts and a counter-shaft parallel therewith together with constant mesh gears for transmittitng rotary motion from the driving-shaft to the counter-shaft and additional constant mesh gears for transmitting rotary motion from the counter-shaft to the driven-shaft through the medium of a sliding clutch on the driven-shaft movable from a neutral position into and out of engagement with the constant mesh gears on the driving and driven-shafts respectively for rotating the driven-shaft at engine speed or at an intermediate speed according to the position of the sliding clutch.

The invention also contemplates the use of a sliding gear splined on the driven-shaft to rotate therewith and slidable axially from a neutral position into and out of engagement with a low speed gear on the counter-shaft and also movable into and out of engagement with an idler gear which in turn is in constant mesh with a reverse drive-pinion on the counter-shaft thereby establishing, in this instance, three forward speeds and one reverse drive.

In most of the power transmitting mechanisms of this type the driven-shaft co-axial with the driving-shaft is journaled at one end in the corresponding end of the gear case while the other end is journaled in a socket in the rear end of the driving-shaft leaving a relatively long section of the driven-shaft free to vibrate radially under the stresses to which it is subjected.

This vibration tends to weaken the shaft by crystallization and also produces excessive noise in operation in addition to the extra wear incidental to such vibration.

One of the objects of the present invention is to reduce this vibration to a minimum and thereby to avoid the attendant objectionable results of excessive noise and wear by providing an intermediate bearing for the driven-shaft and counter-shaft in addition to the end bearings for those shafts.

The general practice here therefore has been to make the major portion of the gear case proper in one cast unit normally closed by a cap section which rendered the assembling of the internal mechanism extremely laborious and expensive without definite knowledge that those internal mechanisms were properly assembled.

Another object is to reduce the time, labor and expense of assembling the gearing within the case and housing by dividing the gear case into two opposed sections in the plane of the axes of the several shafts so that the internal mechanisms may be easily and quickly installed in operative position in the bearings of one of the case sections after which the other case section may be placed in operative position and the two sections firmly bolted together.

Another object is to provide the gear case with a removable cap section having opposite pendant flanges engaged with the corresponding outer faces of the case sections to assist in holding the two sections together face to face.

Another object is to provide the cooperative constant mesh gears with helical teeth arranged so that the angle of obliquity of one set of gears are opposed to those of the other set for the purpose of counteracting or balancing any end thrust which may be produced by the teeth of either set and thereby to further reduce the noise and wear of the bearings for and mechanism carried by the counter-shaft and driving and driven-shafts.

Another object is to arrange the spiral teeth in such manner that the tangents of the angles of obliquity will vary directly as the pitch diameter of the gears.

Other objects and uses relating to specific parts of the power transmitting mechanism will be brought out in the following description.

In the drawings:

Figure 1 is a longitudinal vertical sectional view of a variable speed power transmitting mechanism embodying the various features of my invention.

Figures 2 and 3 are transverse vertical sectional views taken respectively in the planes of lines of 3—3 and 4—4, Figure 1.

Figure 4 is a face view of a portion of the power transmitting mechanism showing the relative angles of obliquity of the constant mesh gears.

As illustrated this mechanism comprises a gear case composed of opposite similar half-sections —1— and —1'— having their meeting faces disposed in a vertical plane passing through the axis of the driven-shaft and counter-shaft and secured together by bolts —2—, said gear case also including a cap section —3— extending across the top of the sections —1— and —1'— and provided with pendant flanges —3'— along its opposite longitudinal edges for engaging the corresponding outer faces of the upper portions of the sections —1— and —1'— to assist in holding said sections in operative position.

The cap section —3— may be secured to the upper marginal edges of the sections —1— and —1'— by bolts or other suitable fastening means and serves as a means for supporting the shifting mechanism for the sliding gear and sliding clutch.

When the sections —1— and —1'— are assembled face to face they form a lubricant chamber —4— which also serves to receive the major portions of the power transmitting mechanism hereinafter described, the front end of the case sections —1— and —1'— being secured by bolts —5— to a supporting frame or head section —6—, Figure 1.

The sections —1— and —1'— are also provided with opposite end partition —7— and —7'— and an intermediate partition —8—, corresponding partitions of both sections being alined with each other and provided with apertures for receiving the clamp bolts —2—.

The front partition —7— is provided with anti-friction bearings —9— and —10— arranged in parallel relation one over the other for receiving and supporting the adjacent portions of a drive-shaft —12— and of a counter-shaft —13— respectively.

The rear partition —7'— is also provided with anti-friction bearings —14— and —15— for receiving the adjacent portions of a driven-shaft —12'— and the counter-shaft —13—.

The intermediate partition —8— is provided with an anti-friction bearing —16— and a plane bearing —17— for receiving and supporting the intermediate portions of the driven-shaft —12'— and counter-shaft —13— respectively and thereby to reduce to a minimum the vibration of the intermediate portions of both the said shafts and at the same time assisting in holding the intermediate constant mesh gears in quiet running engagement with each other.

The anti-friction bearings —9—, —10—, —14— and —15— and —16— are constructed and mounted in their respective partitions in such manner as to resist end thrust and at the same time to hold the shafts —12— and —12'— and —13— against relative axial movement while permitting the free rotation of the shafts.

The counter-shaft —13— is preferably hollow or tubular from end to end and contains a filler —18— of lead, soft rubber or other non-vibrant material for the purpose of absorbing any vibration of the shaft and thereby reducing the noise incidental to such vibration to a minimum.

The frame-head —6— to which the gear case —1— is secured is provided with a removable hub section —19— inserted in an opening therein around the drive-shaft —12— to assist in holding the outer retaining ring for the ballbearings —9— against forward displacement, said retainer ring being held against inner displacement by an annular shoulder —20— which is firmly secured to the adjacent end partition —7—, Figure 1.

The outer retaining ring for the ballbearing —10— is held against outward displacement by the rear wall of the section —6— and is also held against inward displacement by a flange —21— which is secured to the adjacent partition —7—. An additional hub section —22— is secured to the rear end of the gear case —1— around the adjacent portion of the driven-shaft —12'— for holding the outer retaining ring of the ballbearing —14— against rearward displacement, said ring being held against inward displacement by an annular flange —23— which is secured to the adjacent rear end partition —7'—, Figure 1.

The outer retaining ring for the ball bearing —15— is firmly secured in an opening in the rear end partition —7'— and is protected by a cap section —24— which is secured to the rear face of the gear case shown in Figure 1.

The outer retaining ring for the ballbearing —16— for the intermediate portion of the driven-shaft —12'— is further secured in an opening in the intermediate partition —8— and is held against endwise movement by a flange —25— on the inner end of the partition and a screw collar —26— which is secured in an opening in the rear ends of the partition as shown in Figure 1.

The balls of the several bearings travel in grooves in the inner and outer retainer rings and thereby hold the inner retaining rings against relative axial movement.

The inner retaining ring for the ballbearings —9— is secured to the adjacent portion of the drive-shaft —12— which has its inner end enlarged to abut against the end face of the inner ring to hold said shaft and inner ring against relative axial movement in one direction.

The portion of the shaft —12— in front of the inner ring is threaded and engaged by clamping nut —27— to hold the inner ring and shaft against relative axial movement in the opposite direction.

In like manner the inner ball-retaining ring for the bearing —10— is secured to the reduced front end of the counter-shaft —13— and is held against axial movement by a shoulder —28— on said shaft and a nut —29— engaging the front threaded end of said shaft. The inner ball retaining ring of the bearing —15— for the rear end of the counter-shaft is secured to the reduced rear end of said shaft and is held against axial movement between shoulder —30— on the shaft and a nut —31— engaged with a rear threaded end thereof as shown in Figure 1.

The inner ball retaining ring of the bearing —14— is secured to the reduced rear end of the driven-shaft —12'— and is held against axial movement between the shoulder —32— on said shaft and a sleeve or collar —33— which is mounted on the shaft within the hub —22—, said sleeve being held against rearward movement by a coupling member —34— which is secured to the shaft —12'— and is journaled in the rear end of the hub —22—, said coupling member being held against rearward displacement by a nut —35— engaging the rear threaded end of the shaft, Figure 1.

The rear end of the drive-shaft —12— is provided with a gear —36— in constant mesh with a companion gear —37— which is secured to the counter-shaft —13— for transmitting rotary motion to said counter-shaft.

The front end of the driven-shaft —12'— is reduced and journaled in a cylindrical socket —38— in the inner end of the driving-shaft —12— co-axial with and within the gear —36— to permit relative rotation of the driving and driven-shafts.

The intermediate portion of the counter-shaft —13— is provided with a gear —39— in constant mesh with a companion gear —40— which loosely surrounds the intermediate portion of the driven-shaft —12'— and is provided with a rearwardly extending hub —41 journaled in the bearing —16— in the intermediate partition —8— as shown in Figure 1, the hub of the gear —40— being preferably journaled upon a cylindrical portion of the driven-shaft —12'— through the medium of a bushing —42— to permit relative rotation of the intermediate gear and driven-shaft and at the same time to assist in holding the intermediate portion of the driven-shaft against radial vibration.

The gear —40— abuts against the front end of the inner ball retaining ring of the bearing —16— while the rear end of the hub —41— is threaded and engaged by a nut —43— thereby holding the gear —40— against axial movement.

The gear —39— is held against axial movement by the front end of the bearing —17— and a spacing sleeve —45— which also abuts against the rear end of the hub of the gear —37—, said hub being interposed between the sleeve —45— and rear end of the inner ball retaining ring of the bearing —10— to hold said gear —37— against axial movement.

The gears —36— and —40— are arranged in co-axial spaced relation and are provided respectively with internal clutch teeth —47— and —48— adapted to be engaged by clutch teeth —49— and —50— on the opposite ends of a sliding clutch member —51— which is splined on the adjacent portion of the driven-shaft —12'— for axial movement in opposite directions.

This clutch member —51— is provided intermediate its ends with an annular groove —52— adapted to be engaged by any suitable shifting mechanism not shown, but operable at will in the usual manner for sliding gear transmission mechanism.

This clutch member —51— is normally in a neutral position between and out of engagement with the clutch teeth of the corresponding gears —36— and —40— but may be moved into engagement with either of said gears by the operation of shifting mechanism not shown.

For example, when it is desired to drive or rotate the shaft —12'— at engine speed or at the speed of the driving-shaft —12— the clutch member —51— will be shifted into engagement with the teeth —47— of the gear —36—, or when it is desired to rotate the shaft —12'— at a different speed the clutch member —51— will be shifted into engagement with the clutch teeth —48— of the gear —40—, which is then being rotated by the gear —39— on the counter-shaft —13— thereby causing the rotation of the driven-shaft —12'—. The ratio of the gears —36— and —37— is such as to rotate the counter-shaft —13— at a lower rate of speed than that of the driving-shaft while the ratio of the gears —39— and —40— is such as to further reduce the speed of the driven-shaft —12'— when the clutch —51— is in engagement with the gear —40— and commonly known as the intermediate speed.

The rear end wall —7'— and the intermediate partition —8— of the gear case —1— are arranged in axially spaced relation and the portion of the driven-shaft —12'— extending across the intervening space is provided with a series of, in this instance three, radial splines —52— in uniformly spaced relation circumferentially as shown in Figure 3 while the interposed portions of the shaft between the splines is cylindrical to form relatively broad bearings for receiving and supporting a sliding gear —53— which is movable along and upon the adjacent portions of the shaft rotatable therewith.

The hub of the gear —53— is provided with internal splineways or grooves of substantially the same cross sectional form as the splines —52— while the remaining portions of the bore of the hub is cylindrical to fit closely upon the cylindrical portions of the shaft which, together with the splines, serves to firmly hold the gear against lateral vibration in all positions of adjustment and at the same time permits the gear to be shifted axially with a minimum resistance between the bearings —14— and —16—.

This gear —53— is movable into and out of mesh with relatively smaller gear —54— on the counter-shaft —13— whereby relatively low speed rotary motion will be transmitted from the counter-shaft to the driven-shaft —12'—.

The gear —53— is also movable axially into and out of mesh with an idler gear —55— which is loosely mounted upon a stub-shaft —56— within the gear case —1— and is in constant mesh with a companion gear —57— on the counter-shaft —13— whereby rotary motion will be transmitted from the counter-shaft to the driven-shaft —12'— for driving the latter in a reverse direction thus completing shifting cycle for three speeds forward and one speed reverse drive.

The hub of the gear —53— is provided with annular groove —53'— for receiving suitable shifting mechanism not shown but by which the gear may be shifted from its neutral position between the gears —55— and —57—, as shown in Figure 1, into and out of engagement with said gears.

It will be observed that the opposite faces of the splines on the driven-shaft —12'— and corresponding sides of the grooves in the clutch member —51— and gear —53— are radial to the axis of said shaft for reducing the liability of radial thrust of said clutch member and gear and incidentally reducing the liability of vibration of the shaft.

It will also be observed that the constant mesh gears —39— and —40— and also the gear —54— are located closely to the intermediate partition —8— and therefore the inner partition serves to resist radial vibration of the intermediate portions of the driven-shaft —12'— and counter-shaft —13— during the transmission of power from the counter-shaft to the intermediate shaft under intermediate and low speeds and, of course, serves a similar purpose when the transmission is operated under high speed or reverse drive.

Another important feature of the invention consists in providing the constant mesh gears —36— and —37— and —39— and —40— with helical teeth and in arranging the angles of obliquity of the teeth of co-axial gears in opposed relation or at an angle to each other so that the end thrust of either gear in one direction will be counteracted by the end thrust of the other gear in a reverse direction.

In other words the teeth of co-axial gears converge or diverge in one direction relatively to the axis and the angles of obliquity are directly proportionate to the pitch diameters of the gears or, more accurately, the tangent of the angles of obliquity vary according to the diameter of the gear or directly as the pitch radii, the object of which is to establish a more accurate balance of the end thrusts of the co-axial gears.

It will be seen from the foregoing description that the main object of the present invention is to render its operation substantially noiseless by reducing to a minimum the vibration of the shafts and thereby incidentally increasing the durability and reliability of the entire mechanism while the division of the gear case into opposed sections meeting in the plane of the axes of the shafts enable the interior parts to be more easily and accurately assembled in the gear case as a contribution to the noiseless running of the moving parts.

The operation of the invention will now be readily understood upon reference to the description and the accompanying drawings and while the construction shown and described is particularly efficient in carrying out the object of the invention it is evident that various changes may be made in the detail construction without departing from the spirit of the invention.

What I claim is:

1. In a variable speed power transmission having co-axial driving and driven-shafts and a counter-shaft parallel therewith, and a gear case in which said shafts are journaled comprising opposed sections meeting in a plane passing through the axes of said shafts and detachably secured to each other and a cap-plate across the top of the sections having pendant flanges engaging the outer lengthwise sides of the sections to hold the latter against spreading apart.

2. In a variable speed power transmission having constant-mesh intermediate-speed gears, selective means for applying power to one of the gears for driving said gears first in one direction and then in a reverse direction, and a journal bearing for the other gear fixed against axial movement, said other gear having a hub journaled in said bearing and provided with shoulders engaging opposite ends of the bearing to hold said gear against axial thrust.

3. In a variable speed power transmission, a gear-case having opposite end walls and separate sets of co-axial journal bearings therein, said gear-case having an intermediate transverse partition, a driving shaft journaled in one of the bearings of one set, a driven shaft co-axial with and rotatable relatively to the driving-shaft and journaled in the other bearing of that set and also extended through an opening in the partition, a journal bearing in said opening, a countershaft journaled in the end bearings of the other set, costant-mesh gears between the driving shaft and counter-shaft and provided with helical teeth, the gear on the driving shaft having a hub extended through its bearing and provided with shoulders engaging opposite ends of said bearing to resist axial thrust of the gear, constant mesh gears between the counter shaft and driven shaft having helical teeth, the gear on the driven shaft having a hub journaled in the bearing in the partition opening and provided with shoulders engaging opposite ends of said bearing to resist end thrust of the gear, and a clutch splined on the driven shaft and movable from a neutral position into and out of engagement with the gears on the driven shaft and driven shaft respectively.

In witness whereof I have hereunto set my hand this 8th day of August, 1929.

CHARLES H. LOGUE.